Feb. 19, 1929.  
R. O. GILL  
MOTOR VEHICLE TESTING DEVICE  
Filed Jan. 17, 1924  
1,703,031  
2 Sheets-Sheet 1

Inventor  
Reuben O. Gill

Feb. 19, 1929.  R. O. GILL  1,703,031
MOTOR VEHICLE TESTING DEVICE
Filed Jan. 17, 1924   2 Sheets-Sheet 2

Inventor
Reuben O. Gill
By
Attorney

Patented Feb. 19, 1929.

1,703,031

UNITED STATES PATENT OFFICE.

REUBEN O. GILL, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE TESTING DEVICE.

Application filed January 17, 1924. Serial No. 686,940.

This invention relates to a device for testing motor vehicles. It has for one object to provide apparatus for the testing of the chassis and bodies of such vehicles to detect any loosenesses of fit or maladjustment of parts, and to locate any squeaks or rattles present in the vehicle in order that these may be remedied.

Another object of the invention is to provide a device by which such testing of the bodies and chassis of motor vehicles can be performed easily and quickly, without necessitating a road test of the vehicle.

Another object is to provide a relatively inexpensive device of great simplicity, in which the power for operation shall be supplied by the vehicle being tested, and in which the vehicle may be driven by its own power into position on the device, locked thereon, tested, unlocked, and driven off by the operator of the vehicle, without necessitating that the operator leave his seat therein.

A further object of the invention is to provide such a vehicle testing device having simple adjustments adapted to provide variability to the motion imparted to the vehicle.

Other objects of the invention will appear from the following description taken in connection with the drawing, which forms a part of this specification, and in which.

Figure 1:
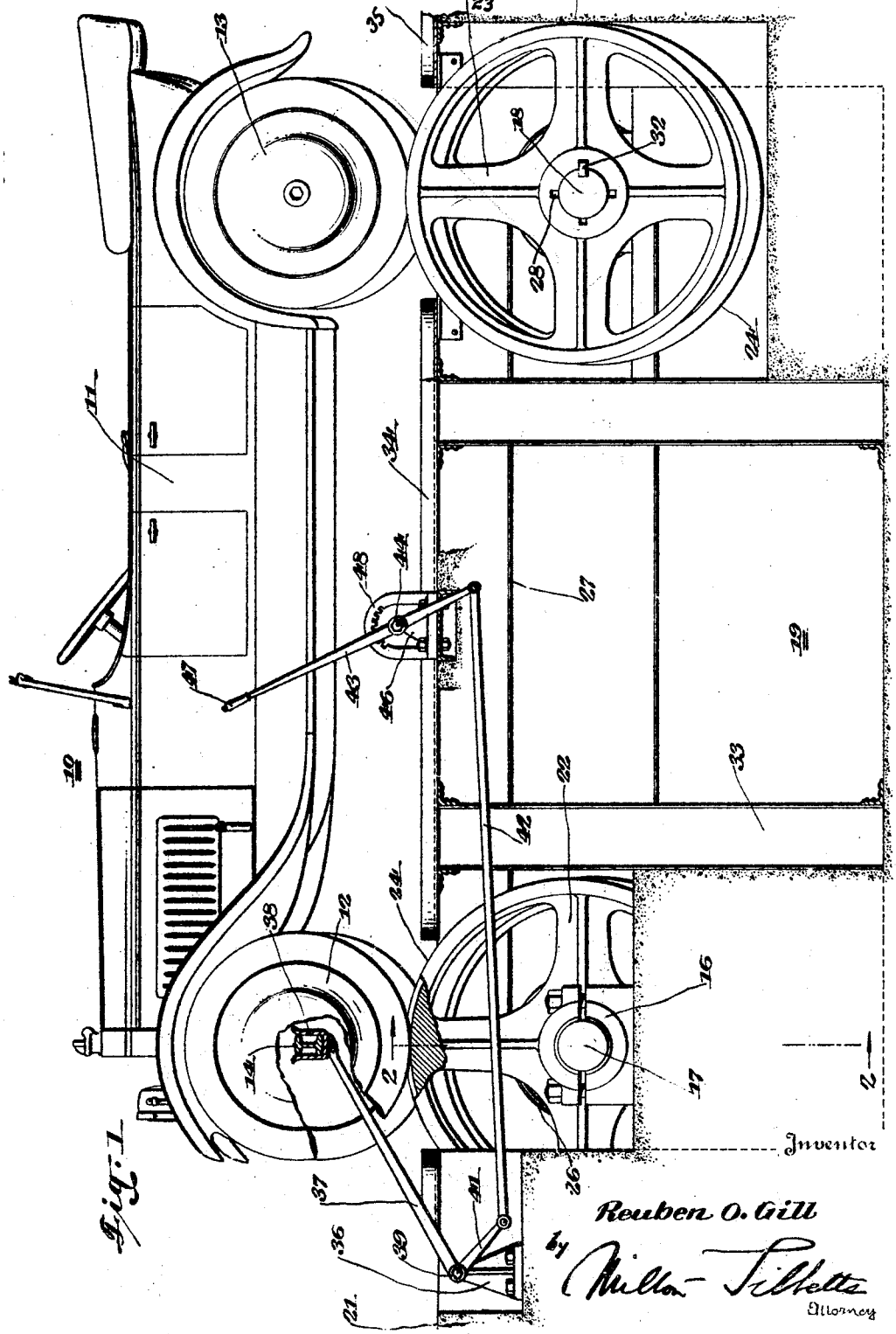
Fig. 1 is a side elevation of a device illustrating the invention, partially in section and partially broken away, and showing a motor vehicle in testing position thereon.

It is customary in the manufacture of motor vehicles to make a careful inspection of finished vehicles for the purpose of discovering and remedying small defects in manufacture and assembly which necessarily occur in production on a large scale, to insure completeness of the vehicle and as far as possible, satisfactory operation thereof on delivery. Such inspections are usually performed while the vehicle is standing still, although to some extent the sending of finished vehicles for short road tests has been practiced. Such road tests are unsatisfactory for the detection and location of many of the annoying sounds which frequently exist in vehicles, caused by lack of adjustment or tightening of various parts thereof, because the operator is not in the best position to discover such sounds and more particularly their location. It is of course apparent that no amount of stationary inspection will disclose the presence of many of these sounds. Furthermore, road testing takes considerable time, and exposes the new vehicle to rain, wind, dust, etc., necessitating a careful and expensive cleaning upon completion of the test. In the present invention is provided a means for imparting to the chassis and body of the motor vehicle a motion in simulation of that obtained in driving the vehicle over a rough road, while at the same time permitting adequate inspection of the vehicle during such motion to determine the cause of any noises present.

Referring to the drawing, at 10 is shown a motor vehicle which is being tested for improper sounds such as would be caused by lack of adjustment or improper or inadequate tightening of any of its parts. The vehicle 10 comprises the usual body 11 mounted upon a suitable chassis (not shown), supported upon front wheels 12 and rear wheels 13. The front wheels 12 are connected by the usual front axle 14, upon which the chassis of the vehicle is mounted.

Suitably supported in any appropriate bearings 16 are a pair of spaced, horizontally disposed shafts 17 and 18, preferably located in a depression or pit 19 formed beneath the general level of the floor 21. Secured to each of the axles 17 and 18 are pairs of wheels 22 and 23, spaced along the shaft a distance substantially equal to the tread of the vehicles to be tested and alined fore and aft of the device. These wheels 22 and 23 are preferably of large diameter relatively to the vehicle wheels 12 and 13, and are provided with curved treads as indicated at 24 adapted to cooperate with the vehicle wheels in a manner readily understood. The shafts 17 and 18 are preferably spaced a distance approximately that of the wheel base of the vehicle, so that when the front wheels 12 of the vehicle are resting upon the testing wheels 22, the rear wheels 13 of the vehicle will rest upon the testing wheels 23.

Figure 2:
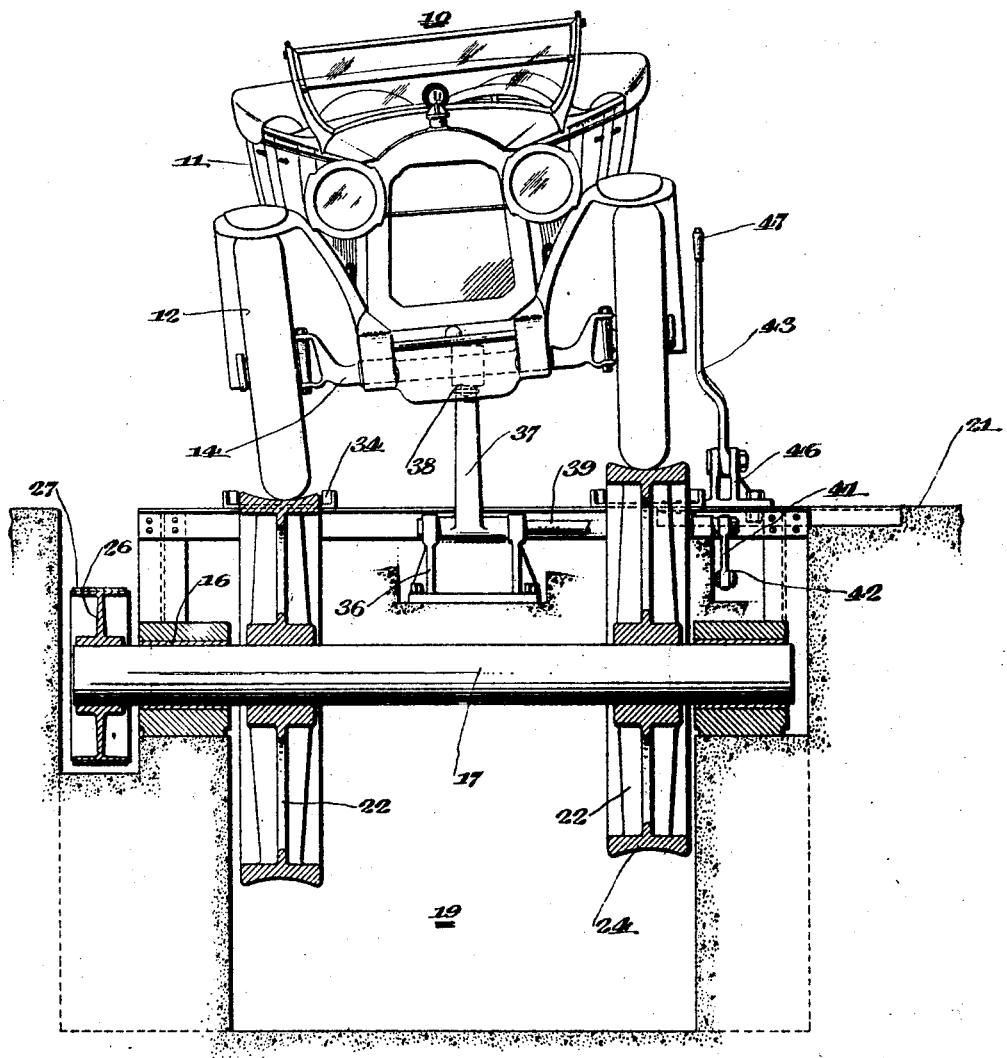
Fig. 2 is a front elevation of the apparatus shown in Fig. 1, partially in section on the line 2—2 of Fig. 1.

The wheels 22 are eccentrically mounted upon the shaft 17, as clearly shown in Fig. 2, and are preferably rigidly secured thereto in such a manner as to have an opposite phase relationship; that is, the longer portion of the right hand wheel 22 will be up when the longer portion of the left hand wheel 22 is down, thus accentuating the difference in level of the treads of these wheels at their uppermost point at any given moment. The rear wheels 23 are similarly mounted eccentrically to the shaft 18.

Figure 3:
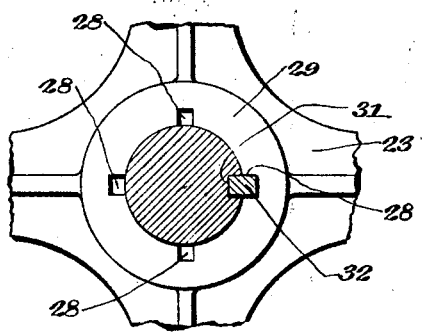
Fig. 3 is a detailed view illustrating the method of varying the angular relation of the rear testing wheels to their shaft, by which the motion imparted to the vehicle by the device may be varied.

The shafts 17 and 18 are prolonged to overhang one of their bearings 16 and are each provided on the overhanging end with a suitable friction pulley 26. The pulleys 26 are adapted for connection by a driving belt 27, which thus forms a resilient connection between the front and rear shafts 17 and 18. It will be seen that sudden application of power to the rear axle 18 for example, will cause the rear pulley 26 to slip on the belt 27 thus changing the phase relation between the front and rear axles 17 and 18. In addition, the phase relation of the rear wheels 23 may be changed with respect to the rear axle 18, and with respect to each other, in any suitable manner. As illustrated in Figs. 1 and 3 this means of adjustment comprises a series of keyways 28 provided at intervals in the hub 29 of each of the wheels 23 each adapted to cooperate with a keyway 31 provided in the shaft 18. The wheel 23 may be locked to the shaft 18 in any of the positions determined by the various keyways 28 by means of a suitable key 32.

The shafts 17 and 18 are preferably supported in the bearings 16 at such a height that the upper portion of the tread 24 of the wheels 22 and 23 when in its lowermost position, is approximately level with the floor 21. Suitably supported, as upon column members 33, are a pair of suitable tracks 34 alined with the treads 24 of the wheels 22 and 23. The tracks 34 may be readily formed of steel channel sections having their flanges disposed upwardly, and are adapted to support and guide the wheels 12 and 13 of the vehicle 10 during passage thereof between the testing wheels 22 and 23. The tracks 34 are preferably supported at approximately the floor level 21, in such a manner that the surface of the web member of the channel with which the vehicle wheels 12 and 13 coacts is substantially tangent to the upper portion of the tread 24 when in its lowermost position. Similar tracks 35 extend away from the wheels 22 and 23 on either side, and serve to guide the vehicle wheels 12 and 13 in approaching and leaving the testing device.

Rigidly secured in a suitable depression in the floor forwardly of the axle 17 and between the tracks 35 is an anchor 36, on which is pivotally mounted an arm 37. The upper end of the arm 37 is provided with a member 38 adapted to engage the front axle 14 of the vehicle. As shown, the member 38 includes a pair of upwardly disposed jaws which are raised to a position on either side of the axle 14, but it is to be understood that any suitable device adapted to removably connect the arm 37 to the axle 14 may be employed. The arm 37 is rigidly secured to a shaft 39, pivotally mounted on the anchor 36 and provided at its outer end with a depending arm 41. This arm 41 is adapted for actuation by a rearwardly extending link 42 arranged at the side of the pit 19. The link 42 is connected to the lower end of an upstanding lever 43 suitably pivoted as at 44 to a standard 46 secured to the floor beside the pit 19. The upper end of the lever 43 is provided with a handle 47, and extends upwardly sufficiently to be reached and operated by a driver sitting in the driver's seat of the vehicle 10. The lever 43 may be provided with a suitable pawl, to engage a ratchet plate 48 in the well known manner.

The operation of this device will be readily understood. The vehicle 10 to be tested is driven across the rearwardly disposed tracks 35 and the intermediate tracks 34 until its front wheels 12 rest upon the front test wheels 22, and its rear wheels 13 rest upon the rear test wheels 23 in the position illustrated in Fig. 1. In this position, the operator manipulates the lever 43 so as to raise the arm 37, and with it the member 38 into position engaging the axle 14, as shown in Fig. 1. The vehicle is then started in the usual manner but since it is held against longitudinal motion with respect to the device by the locking assembly including the member 38 and the arm 37 it follows that rotation of the rear or drive wheels 13 will cause a rotation of the rear test wheels 23 and the shaft 18. This motion of the shaft 18 is communicated to the shaft 17 by means of the pulley 26 and the belt 27. As the shafts 17 and 18 rotate, the wheels 22 and 23 rotate about them with an eccentric motion, rising and falling, thus imparting to the vehicle 10 a shaking or wobbling motion similar to that which would be obtained by driving the vehicle over a rough or bumpy road. During this test the vehicle is carefully inspected by operators located in the pit 19 or in other convenient points of vantage about the vehicle for the purpose of detecting any squeaks or rattles in the body or chassis of the vehicle caused by looseness, maladjustment, etc., and remedying these defects. If combinations of motions are desired these are obtained by stopping the vehicle, and changing the relation of the rear test wheels 23 to their axle 18, or to each other, by changing the keyway 28 which cooperates with the keyway 31. In this way different combinations of motions between the two rear test wheels 23, and between these rear test wheels and the front test wheels 22 may be readily obtained. Other variations in the relationships of the various test wheels may be obtained if desired by suddenly speeding up the rear wheels 13 of the vehicle 10. The resulting sudden motion of the rear test wheels 23 causes the belt 27 to slip on its pulley 26 and consequently to vary the relationship between the front and rear axles 17 and 18.

It will be understood that various forms of the invention other than those described above may be used without departing from the spirit or scope of the invention.

What is claimed is:

1. In a device for testing motor vehicles, a pair of spaced horizontal shafts, bearings for said shafts, a pair of wheels eccentrically mounted on each shaft to rotate therewith, a pulley on each shaft, a belt connecting the pulleys, and releasable means adapted to engage the front axle to alone secure a motor vehicle against motion transverse to the shafts.

2. In a device for testing motor vehicles, a front shaft, a pair of wheels rigidly secured thereto in eccentric relation, a rear shaft, a pair of wheels adjustably secured thereto in eccentric relation, and a flexible driving connection between the shafts.

3. In a device for testing motor vehicles, pairs of alined wheels having tread surfaces adapted to cooperate with the vehicle wheels and means mounting said wheels for eccentric rotation, stationary tracks disposed between and on both sides of said wheels, said tracks being alined with the wheels and substantially tangent thereto, mean mounted between the tracks for locking and unlocking said vehicle against longitudinal movement with respect to said shafts and means to operate said locking device from the vehicle seat.

4. In a device for testing motor vehicles, pairs of wheels, bearings mounting said wheels eccentrically, said wheels adapted to cooperate with the front and the rear vehicle wheels respectively, means for locking the vehicle chassis against longitudinal motion with respect to the eccentrically mounted wheels and means to operate said locking device from the vehicle seat.

5. In a device for testing motor vehicles, pairs of wheels, bearings mounting said wheels eccentrically, said wheels adapted to cooperate with the front and the rear vehicle wheels respectively, a stationary bracket, an arm pivotally secured thereto, a member on the end of said arm adapted to engage the vehicle axle, and means connected to said member and operable from the vehicle seat to swing the member into engagement with the vehicle axle whereby longitudinal movement of the vehicle is prevented.

6. In a device for testing motor vehicles, a pair of shafts, a pair of wheels eccentrically mounted on each shaft having surfaces adapted to cooperate with the wheels of the vehicle, stationary tracks between and in line with the cooperating wheels on each shaft, means including a member engaging the vehicle front axle adapted to lock the vehicle against longitudinal movement away from said wheels, and means connecting the shafts, whereby motion communicated to the rear shaft by the rear wheels of the vehicle is transmitted to the vehicle front wheels.

7. In a device for testing motor vehicles, a pair of shafts spaced a distance approximating the wheel base of the vehicle, a pair of wheels of larger diameter than the vehicle wheels eccentrically mounted on each shaft a distance apart approximating the tread of the vehicle and having treads curved in section adapted to cooperate with the vehicle wheels to prevent lateral movement of the vehicle, and means for locking the vehicle against forward motion with the vehicle wheels resting on the wheels of the device.

8. A device for testing motor vehicles comprising spaced wheels of large diameter relative to the vehicle wheels and adapted to cooperate with the vehicle wheels, each of said large wheels being eccentrically mounted to impart a rising and falling motion to the vehicle, the relation of the eccentricity of the forward wheels being fixed and means to permit adjustment of the relation of the eccentricity of the rear wheels.

In testimony whereof I affix my signature.

REUBEN O. GILL.